(12) United States Patent
Yamamoto et al.

(10) Patent No.: US 10,221,884 B2
(45) Date of Patent: Mar. 5, 2019

(54) ROTATING SHAFT, ROLLER, SHEET CONVEYANCE DEVICE, AND IMAGE FORMING APPARATUS

(71) Applicant: CANON KABUSHIKI KAISHA, Tokyo (JP)

(72) Inventors: Daisuke Yamamoto, Kawasaki (JP); Masanobu Kanoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/538,037

(22) PCT Filed: Nov. 25, 2015

(86) PCT No.: PCT/JP2015/005855
§ 371 (c)(1),
(2) Date: Jun. 20, 2017

(87) PCT Pub. No.: WO2016/103573
PCT Pub. Date: Jun. 30, 2016

(65) Prior Publication Data
US 2017/0328399 A1    Nov. 16, 2017

(30) Foreign Application Priority Data

Dec. 24, 2014    (JP) .................... 2014-260468

(51) Int. Cl.
*B65H 3/06* (2006.01)
*F16C 3/02* (2006.01)
(Continued)

(52) U.S. Cl.
CPC ............ *F16C 3/02* (2013.01); *B65H 3/0638* (2013.01); *B65H 5/062* (2013.01);
(Continued)

(58) Field of Classification Search
CPC ..... F16C 3/02; B65H 240/40; B65H 2404/41; B65H 2404/411; B65H 2404/134; B65H 2404/1344; B65H 2404/1347; B65H 2404/1346; B65H 3/0638; B65H 3/06; B65H 2404/1342; B65H 2404/13421; B65H 3/0607; B65H 2403/512;
(Continued)

(56) References Cited

U.S. PATENT DOCUMENTS 5,520,407 A * 5/1996 Alatalo ................ B60G 21/051
                                              228/144
6,979,800 B2 * 12/2005 Kohne ................... B41J 2/0057
                                              219/213
(Continued)

FOREIGN PATENT DOCUMENTS

CN           1782898 A      6/2006
CN         201320556 Y     10/2009
(Continued)

*Primary Examiner* — Jeremy R Severson
(74) *Attorney, Agent, or Firm* — Canon U.S.A., Inc. IP Division (57) ABSTRACT

To provide a rotating shaft with which flexibility of forming a bend is increased, and the strength is increased while reducing the amount of material.
A V-shaped rotating shaft formed by bending sheet metal. An angle formed on an inner side of a bent portion is less than 90°.

6 Claims, 13 Drawing Sheets

(51) Int. Cl.
*G03G 15/00* (2006.01)
*B65H 5/06* (2006.01)
*G03G 15/20* (2006.01)

(52) U.S. Cl.
CPC ... *G03G 15/6529* (2013.01); *B65H 2404/134* (2013.01); *B65H 2404/1347* (2013.01); *B65H 2404/41* (2013.01); *B65H 2801/06* (2013.01); *F16C 2220/42* (2013.01); *G03G 15/2053* (2013.01); *G03G 2215/00679* (2013.01)

(58) Field of Classification Search
CPC ............ F01L 1/047; F01L 2001/0471; F01L 2001/0475; Y10T 74/2101; G03G 15/2053; G03G 13/20; G03G 15/20; G03G 15/2014; G03G 15/2017; G03G 15/2028; G03G 15/2064
See application file for complete search history.

(56) References Cited

U.S. PATENT DOCUMENTS

| 7,971,987 | B2 * | 7/2011 | Godil | B41J 29/393 347/103 |
| 8,376,351 | B2 * | 2/2013 | Ishikura | B65H 3/0638 271/119 |
| 2006/0017213 | A1 * | 1/2006 | Maeda | B65H 3/0638 271/10.01 |

FOREIGN PATENT DOCUMENTS

| CN | 101923302 A | | 12/2010 |
| JP | 63-134443 A | | 6/1988 |
| JP | 4-254881 A | | 9/1992 |
| JP | 5-142947 A | | 6/1993 |
| JP | 2000-247461 A | | 9/2000 |
| JP | 2000247461 A | * | 9/2000 |
| JP | 2004-217358 A | | 8/2004 |
| JP | 04050840 B2 | | 2/2008 |
| JP | 2010-199175 A | | 9/2010 |

* cited by examiner

ROTATING SHAFT, ROLLER, SHEET CONVEYANCE DEVICE, AND IMAGE FORMING APPARATUS

TECHNICAL FIELD

The present invention relates to rotating shafts that receive torque and a bending force used for a sheet conveyance device and an image forming apparatus and relates to a roller, the sheet conveyance device, and the image forming apparatus that includes the rotating shafts.

BACKGROUND ART

Figure 11A:
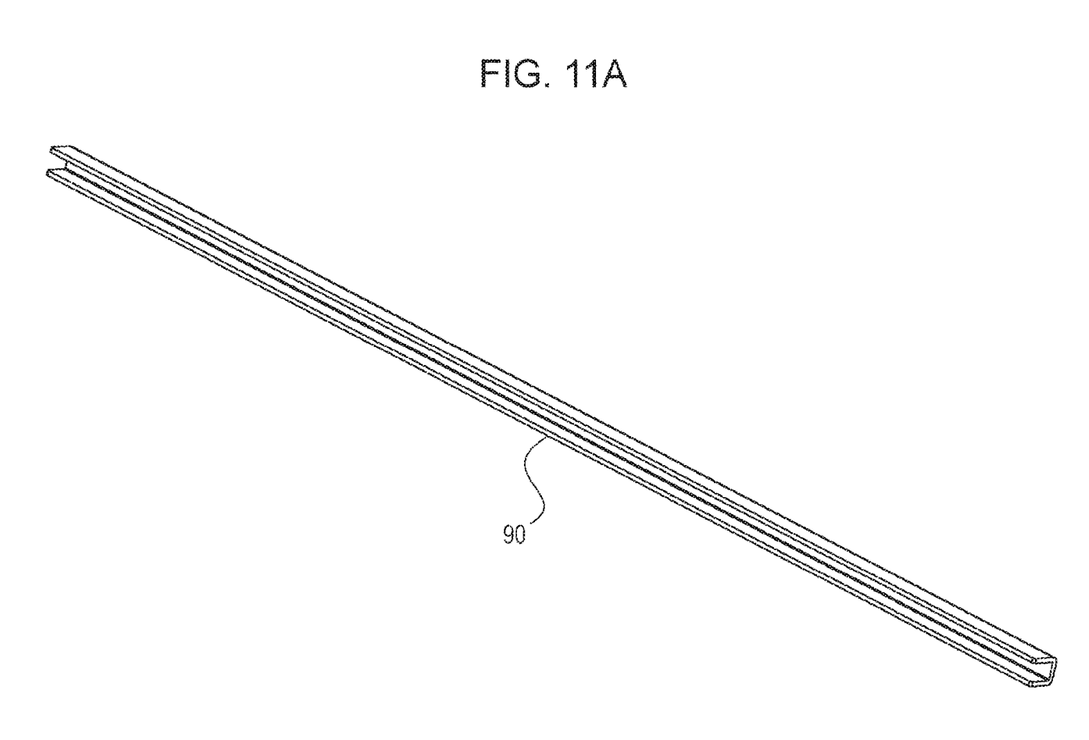
FIG. 11A is a perspective view of a related-art rotating shaft.

Metal shafts having a circular section have been widely used as typical rotating shafts (drive shafts and driven shafts) for an image forming apparatus and a sheet conveyance device such as a rotating shaft of, for example, a conveyance roller. Nowadays, however, from the viewpoints of productivity and cost, rotating shafts formed by bending sheet metal into a U shape are also used. FIG. 11A illustrates a rotating shaft 90 formed by bending sheet metal into a U shape.

CITATION LIST

Patent Literature

PTL 1: Japanese Patent Laid-Open No. 2010-199175

SUMMARY OF INVENTION

Technical Problem

Figure 11B:
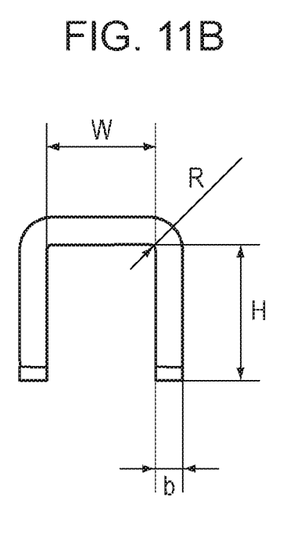
FIG. 11B is a sectional view of the related-art rotating shaft.

However, with such a rotating shaft formed by bending sheet metal into a U shape, there are restrictions on forming a bend generally due to a reason of production. One of such restrictions on forming a bend is that, for example, in the rotating shaft 90 of FIG. 11B, when the height is H, the width is W, the sheet thickness is b, and the radius of curvature of the bent portion is R, it is required that H and W be 2b+R (mm) or more.

Furthermore, the above-described rotating shaft formed by bending sheet metal into U shape originally has less strength than that of a metal shaft having a circular section. Thus, it is desired that the strength be increased while reducing the amount of material.

Accordingly, the present invention provides a rotating shaft with which flexibility of the shaft design is increased, and the strength is increased while reducing the amount of material.

Solution to Problem

The present invention provides a V-shaped rotating shaft formed by bending sheet metal. An angle formed on an inner side of a bent portion is less than 90°.

Further features of the present invention will become apparent from the following description of an exemplary embodiment with reference to the attached drawings.

Advantageous Effects of Invention

According to the present invention, a structure having a higher strength can be made of a smaller amount of the sheet metal. Furthermore, since sheet metal is bent into a V shape only at a single portion, flexibility of the shaft design is increased. Furthermore, by setting an inner angle of the bent portion to less than 90°, a rotating shaft of a smaller diameter can be produced. This can also reduce the cost.

DESCRIPTION OF EMBODIMENT

An embodiment of the present invention will be described below in detail with an example with reference to the drawings. It should be understood that the dimensions, the materials, the shapes, the relative arrangement, and so forth of elements described in the following embodiment are appropriately changed in accordance with a structure and conditions of a device to which the present invention is applied. Accordingly, unless otherwise described in particular, it is not intended that the scope of the present invention is limited to the following embodiment.

Figure 1:
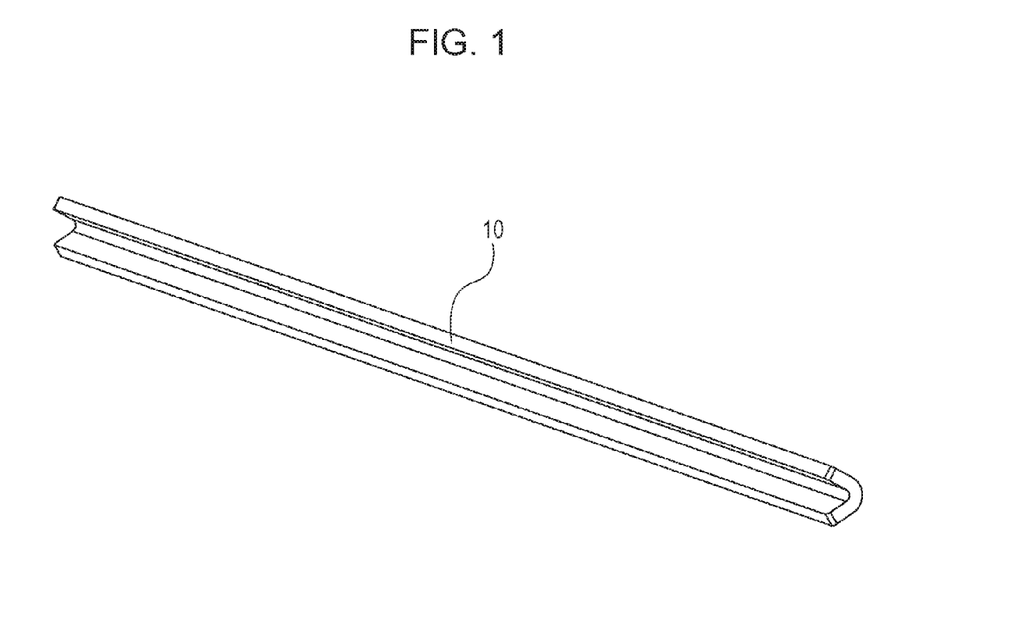
FIG. 1 is a perspective view of a rotating shaft according to an embodiment.

An Embodiment of the present invention will be described in detail below with reference to the drawings. A rotating shaft according to an embodiment is, as illustrated in FIG. 1, a V-shaped rotating shaft 10 formed by bending sheet metal. An angle θ formed on the inner side (referred to as "inner angle" hereafter) of a bent portion of this rotating shaft 10 is less than 90°. The details are as follows.

Strength Calculation Method

In general, a rotating shaft formed by bending sheet metal that is a sheet-shaped metal material receives torque and bending stress. The following considerations from two viewpoints are required for such a rotating shaft: (1) the shaft is not twisted even when the shaft receives the torque; and (2) the shaft is not bent even when the shaft receives the bending stress. These will be sequentially described in detail below. Here, the rotating shaft may be a rotating drive shaft that drives while rotating or a rotating driven shaft that is driven to rotate.

(1) In order for the shaft not to be twisted even when the shaft receives the torque, a high torsional constant is required. In the case of the sheet-metal rotating shaft, when the sheet thickness is b and the total length of the sides is ht, the torsional constant J is given by the following equation 1:

[Math. 1]

$$J = \frac{1}{3} h_t b^3 \quad \text{equation 1}$$

Thus, when various sectional shapes have the same sheet thickness b and the same total length ht of the sides, any of these sectional shapes has the same torsional constant J.

Here, rotating shafts of various shapes formed by bending the sheet metal having the same torsional constant J are illustrated in FIGS. 2A to 2F. The rotating shafts illustrated in FIGS. 2A and 2B have U-shapes. The inner angles θ of the bent portions of these rotating shafts are 90°. The rotating shaft illustrated in FIG. 2C has an L-shape. The inner angle θ of the bent portion of this rotating shaft is 90°. The rotating shaft illustrated in FIG. 2D has a V shape. The inner angle θ of the bent portion of this rotating shaft is 49.9°. The rotating shaft illustrated in FIG. 2E has a folded shape. The inner angle θ of the bent portion of this rotating shaft is 0°. The rotating shaft illustrated in FIG. 2F has a hollow circular shape. In each of the rotating shafts of various shapes illustrated in FIGS. 2A to 2F, the sheet thickness b=1 and the total length ht of the sides=20. Thus, each of the rotating shafts has the torsional constant J=6.67.

(2) In order for the shaft not to be bent even when the shaft receives the bending stress, a high moment of inertia of area is required. The moment of inertia of area Ix about the x axis (including barycenter) can be calculated by the following equation 2 when the axis perpendicular to the x axis is y axis in the section by using a spreadsheet, simulation software, or the like.

[Math. 2]

$$I_x = \int y^2 dA \quad \text{equation 2}$$

In the case of the rotating shaft, a direction in which the rotating shaft receives bending changes in accordance with the rotational angle of the rotating shaft. Thus, it is required that the moment of inertia of area be calculated at rotational angles throughout a rotation and minimum values of the calculated moment of inertia of area be compared. By comparing the moments of inertia of area of the various shapes having the same total length ht of the sides, the shape having the high strength can be found in a most rational manner.

Results of Strength Calculation of Rotating Shafts of Various Shapes

Figure 2A:
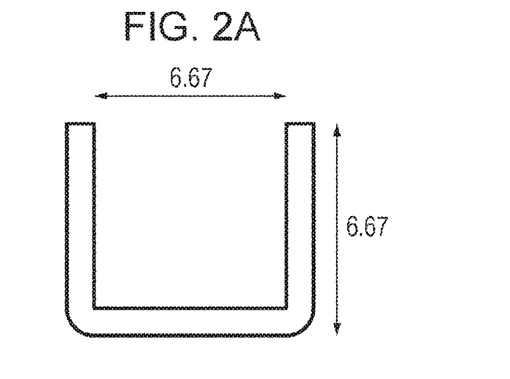
FIG. 2A is a sectional view of a rotating shaft having one of various shapes.
Figure 2B:
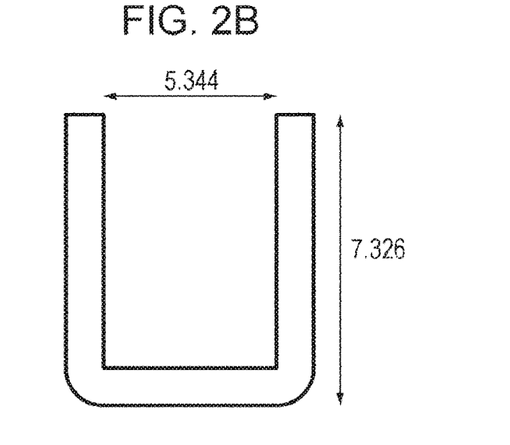
FIG. 2B is a sectional view of a rotating shaft having one of the various shapes.
Figure 2C:
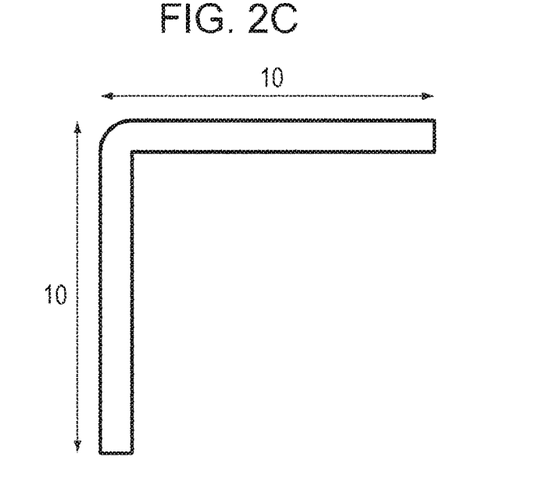
FIG. 2C is a sectional view of a rotating shaft having one of the various shapes.
Figure 2D:
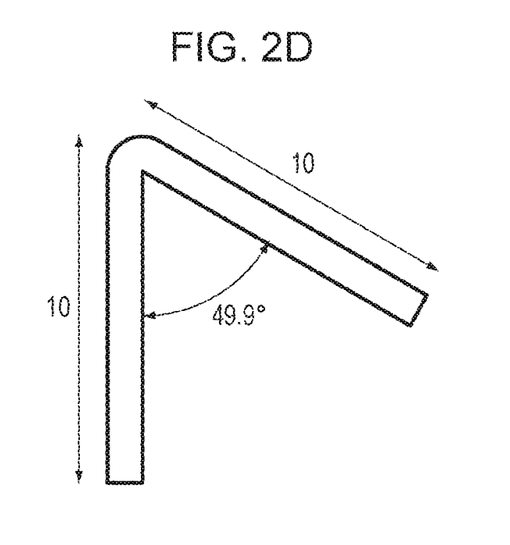
FIG. 2D is a sectional view of a rotating shaft having one of the various shapes.
Figure 2E:
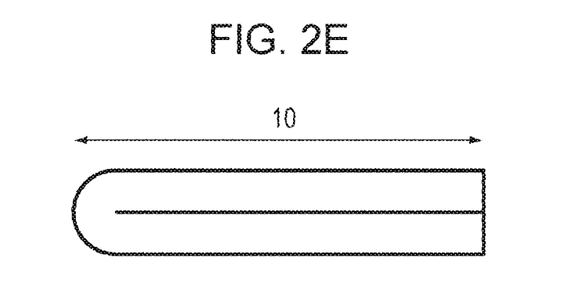
FIG. 2E is a sectional view of a rotating shaft having one of the various shapes.
Figure 2F:
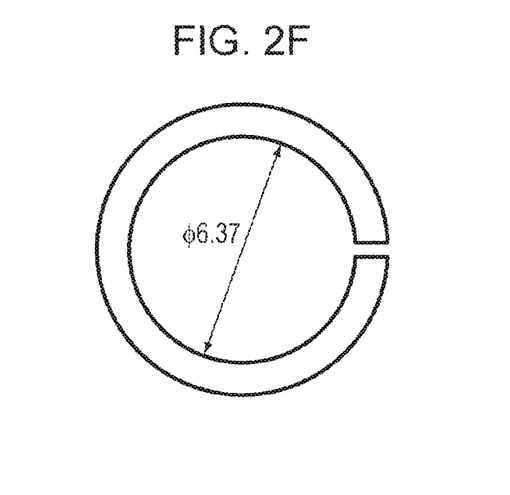
FIG. 2F is a sectional view of a rotating shaft having one of the various shapes.
Figure 3A:
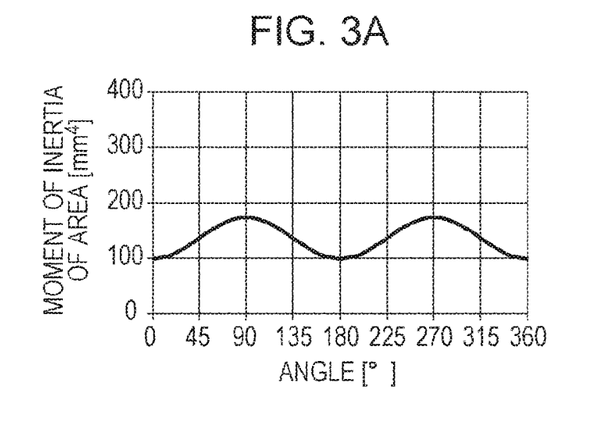
FIG. 3A is a graph illustrating a calculation result of the moment of inertia of area of the rotating shaft having the shape of FIG. 2A.
Figure 3B:
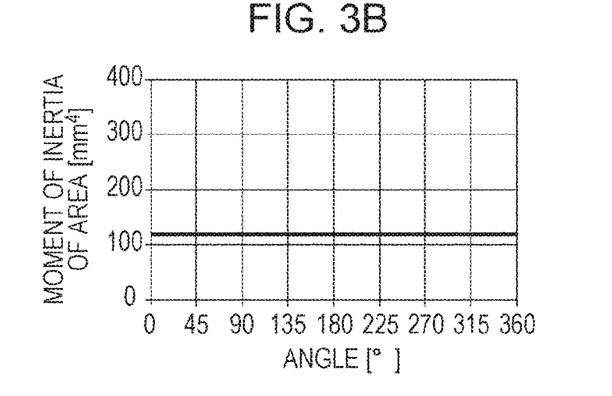
FIG. 3B is a graph illustrating a calculation result of the moment of inertia of area of the rotating shaft having the shape of FIG. 2B.
Figure 3C:
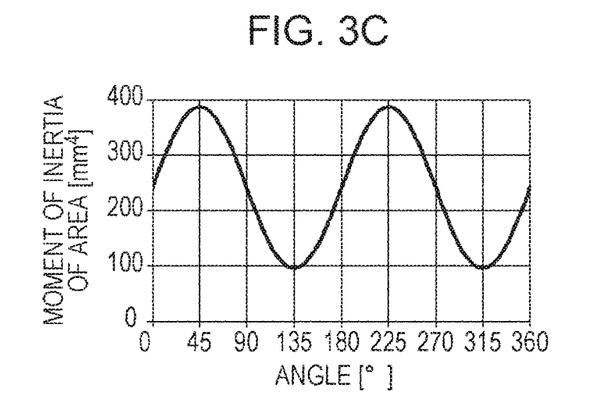
FIG. 3C is a graph illustrating a calculation result of the moment of inertia of area of the rotating shaft having the shape of FIG. 2C.
Figure 3D:
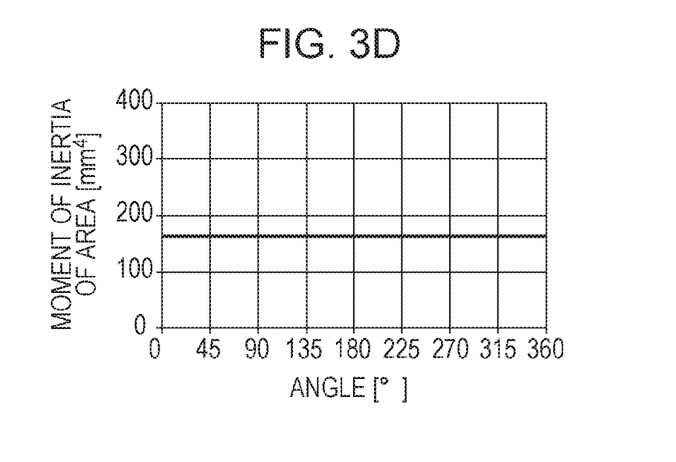
FIG. 3D is a graph illustrating a calculation result of the moment of inertia of area of the rotating shaft having the shape of FIG. 2D.
Figure 3E:
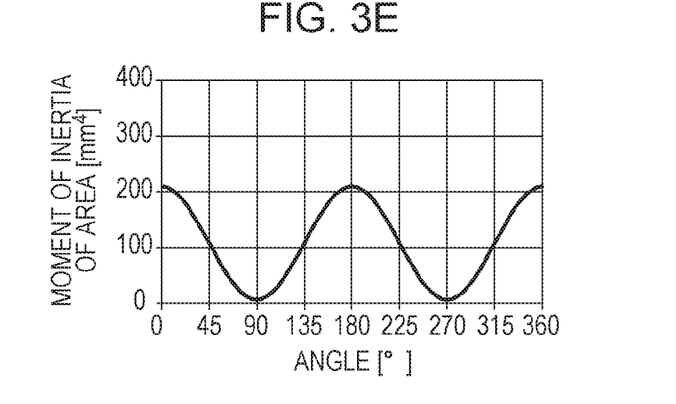
FIG. 3E is a graph illustrating a calculation result of the moment of inertia of area of the rotating shaft having the shape of FIG. 2E.
Figure 3F:
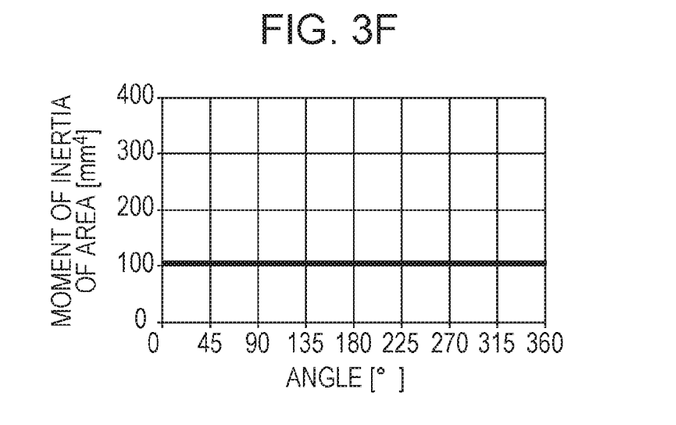
FIG. 3F is a graph illustrating a calculation result of the moment of inertia of area of the rotating shaft having the shape of FIG. 2F.

FIGS. 3A to 3F and Table 1 illustrate results of calculation of the moments of inertia of area of the rotating shafts of various shapes illustrated in FIGS. 2A to 2F having the same torsional constant J at rotational angles throughout the rotation. The rotating shafts of the various shapes illustrated in FIGS. 2A to 2F respectively correspond to FIGS. 3A to 3F and a to f in Table 1. When the minimum values of the moment of inertia of area of the rotating shafts of the various shapes illustrated in FIGS. 3A to 3F and Table 1 are compared, the V-shaped rotating shaft of FIG. 2D has the highest moment of inertia of area among the rotating shafts of the various shapes. It is noted that calculation to be described later is performed so that the inner angle θ of the bent portion of the V-shaped rotating shaft illustrated in FIG. 2D is an angle with which the moment of inertia of area is constant at rotational angles throughout the rotation.

TABLE 1

| (mm⁴) | a | b | c | d | e | f |
| --- | --- | --- | --- | --- | --- | --- |
| MAX | 174 | 119 | 386 | 163 | 210 | 104 |
| MIN | 99.3 | 119 | 95 | 163 | 7 | 104 |

Results of Strength Calculation and about Optimum Inner Bending Angle

In the case where the moment of inertia of area is constant independently of the rotational angle, a bending amount of the rotating shaft is constant independently of the rotational angle as long as a radial load applied to the rotating shaft is constant. That is, such an inner bending angle (inner angle of the bent portion) is an optimum inner bending angle at which the moment of inertia of area is constant independently of the rotational angle.

Figure 4A:
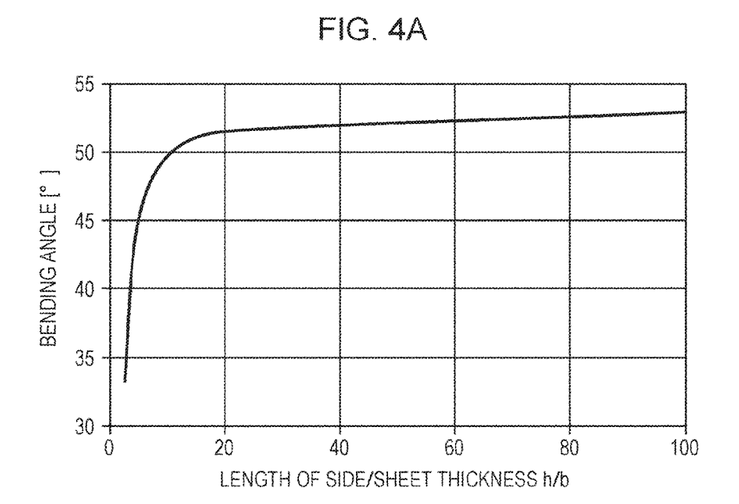
FIG. 4A is a graph illustrating an inner bending angle of a bent portion for length of a side/thickness with constant bending.
Figure 4B:
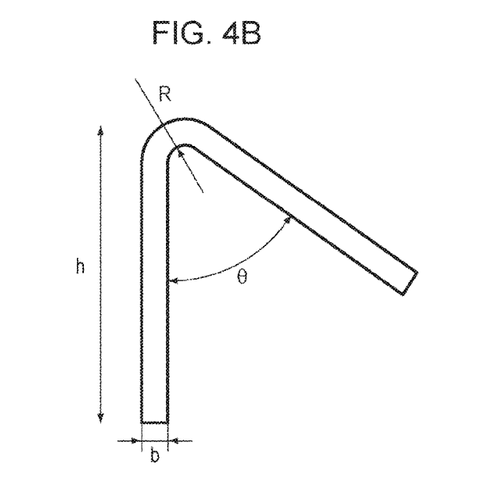
FIG. 4B is a sectional view of a rotating shaft.

A rotating shaft having a V-shaped section illustrated in FIG. 4B corresponds to the rotating shaft having the shape illustrated in FIG. 2D. FIG. 4B illustrates a section of the rotating shaft 10 formed by bending only a single portion of the sheet metal into the V shape. FIG. 1 is a perspective view of the rotating shaft 10 illustrated in FIG. 4B. In the rotating shaft 10 having the V-shaped section illustrated in FIG. 4B, b is the sheet thickness, h is the length of the side, R is the radius of curvature on the inner side of the bent portion, and θ is the inner angle of the bent portion. In the rotating shaft 10 having the V-shaped section illustrated in FIG. 4B, as a condition under which the moment of inertia of area is constant independently of the rotational angle, an optimum inner bending angle θ is determined for the ratio h/b of the length h of the side and the sheet thickness b. Results of calculation performed in accordance with the above description are illustrated in FIG. 4A and listed in Table 2. With each h/b, calculation is performed by varying the inner bending angle θ of FIG. 4B so as to obtain an optimum inner bending angle θ. Table 2 lists the inner bending angle for the length of the side/thickness with constant bending. Here, in the production of the rotating shaft formed by bending the sheet metal, there is a condition (h is 2b+R or more) for bending. With this condition taken into consideration, the optimum inner bending angle θ is from about 33 to 53° in accordance with the results illustrated in FIG. 4A and listed in Table 2.

TABLE 2

| Length of a side/sheet thickness | Optimum inner bending angle |
|---|---|
| 2 | 33.1 |
| 2.5 | 38.0 |
| 3 | 41.0 |
| 4 | 44.5 |
| 5 | 46.4 |
| 6 | 47.6 |
| 8 | 49.1 |
| 10 | 49.9 |
| 15 | 51.0 |
| 20 | 51.6 |
| 50 | 52.5 |
| 100 | 52.8 |

According to the present embodiment, a structure having a higher strength can be obtained from a smaller amount of the sheet metal. Furthermore, since the sheet metal is bent into the V shape only at a single portion, flexibility of the shaft design is increased. Furthermore, by setting the inner angle θ of the bent portion to less than 90°, the rotating shaft of a smaller diameter can be produced. This can also reduce the cost.

Examples Applied to Image Forming Apparatus

Figure 5:
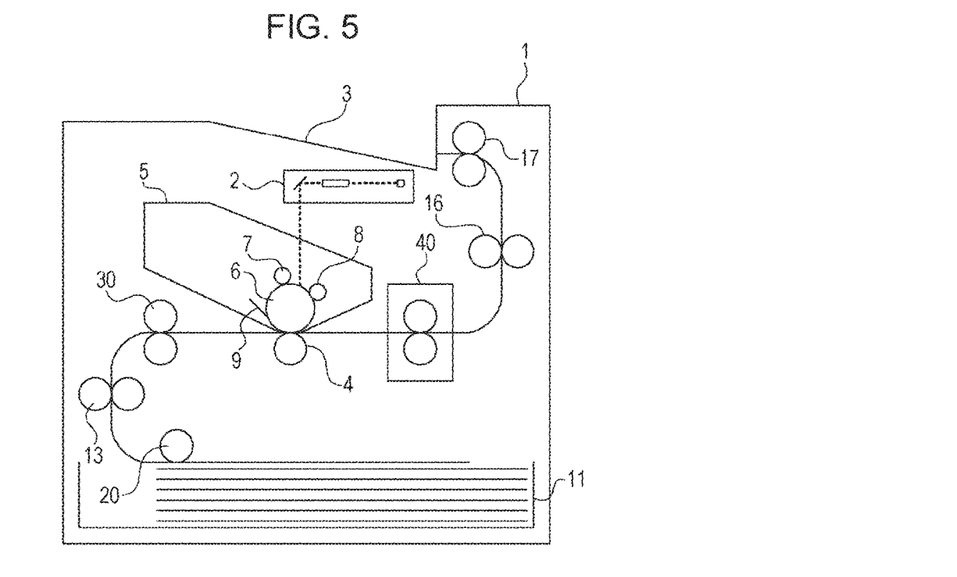
FIG. 5 is a schematic sectional view of the structure of an image forming apparatus.

An image forming apparatus using the above-described rotating shaft having the V-shaped section is described below with examples. FIG. 5 is a schematic sectional view of the structure of a printer serving as the image forming apparatus.

A laser beam printer 1 of FIG. 5 includes an image forming section that forms an image, a sheet feed device (feed roller unit) that separates one sheet after another from sheets and feeds each of the sheets to the image forming section, a laser scanner unit 2, a fixing device 40, an output tray 3, and so forth. Here, the image forming section includes a process cartridge 5 detachably attachable to a laser beam printer main body (referred to as "apparatus main body" hereafter), a transfer roller 4, and so forth. The process cartridge 5 includes a photosensitive drum 6, a charging roller 7, a developing device 8, a cleaning device 9, and so forth.

When image information is transmitted from a personal computer or the like, and a controller having been performed an image forming process on the image information transmits a print signal, attraction is performed by a solenoid so as to allow rotation only when the sheet is fed, and a feed roller 201 is rotated. Thus, the sheets loaded in a feed cassette 11 are fed one sheet after another. Each of the sheets having been fed is conveyed to the image forming section by conveyance roller pairs 13 and 30. Meanwhile, along with this print instruction, a latent image is formed on the photosensitive drum 6 in accordance with the image information. The latent image is developed and transferred onto the sheet so as to form an image. The sheet onto which the image has been transferred is fed to the fixing device 40, so that the image is fixed. After that, the sheet passes through a conveyance roller pair 16 and is output onto the output tray 3 by an output roller pair 17.

Examples of the structures will be described below in which the above-described V-shaped rotating shaft is used as a rotating shaft supporting a rotating member of the sheet feed device that feeds the sheet, a sheet conveyance device that conveys the sheet having been fed, and the fixing device of the above-described image forming apparatus.

First Example

Figure 6:
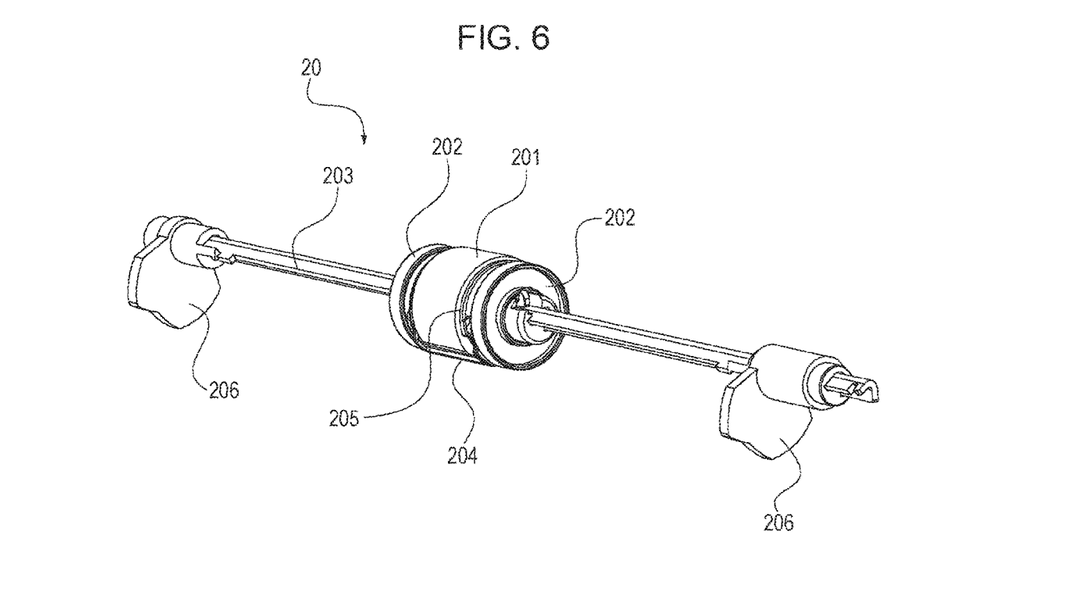
FIG. 6 is a perspective view of a feed roller unit using a rotating shaft of a first example.

As illustrated in FIG. 6, a feed roller unit 20 serving as the sheet feed device includes the feed roller 201, feed driven rollers 202, a feed drive shaft 203, a feed roller core 204, a feed roller holder 205, and feed cams 206. The feed drive shaft 203 that supports the feed roller 201 serving as a rotating member is a V-shaped rotating shaft formed by bending sheet metal. An inner angle θ of a bent portion of the feed drive shaft 203 is from 33 to 53°.

Figure 7:
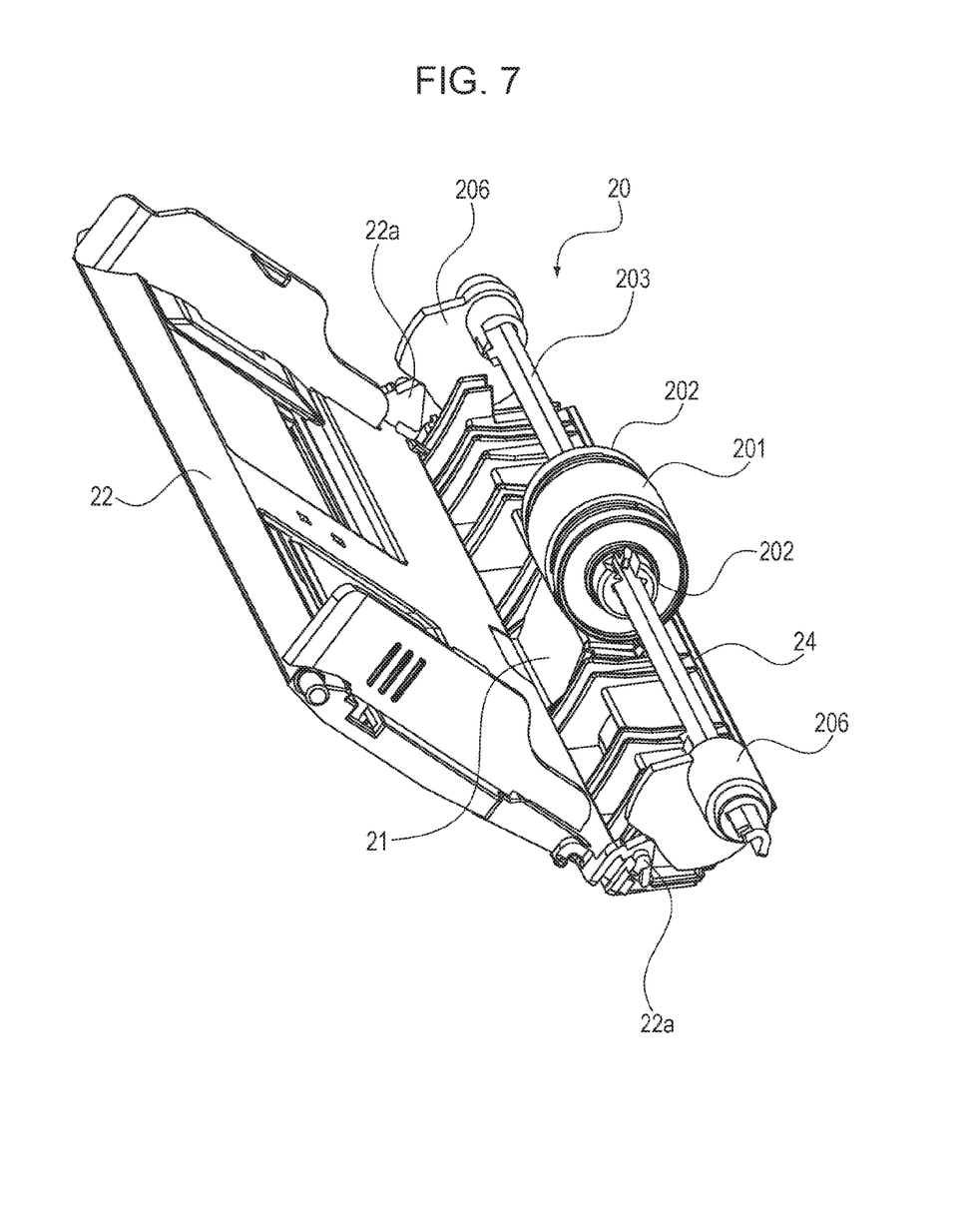
FIG. 7 is a perspective view of the feed roller unit using the rotating shaft of the first example.

Referring to FIG. 7, a separation pad 21 and an intermediate plate 22 are provided on a side facing the feed roller unit 20. The intermediate plate 22 is urged toward the feed roller 201 by a spring (not illustrated). By contact of the feed cams 206 with contact portions 22a of the intermediate plate 22, the feed roller 201 and the intermediate plate 22 are separated from each other. By performing attraction by the solenoid (not illustrated), the feed roller unit 20 is rotated counterclockwise, thereby the feed cams 206 and the contact portions 22a of the intermediate plate 22 are separated from one another. This urges the intermediate plate 22 on which the sheet is loaded toward the feed roller 201. Consequently, the sheet is brought into pressure contact with the feed roller 201 and fed by the feed roller 201.

With the above-described structure, bending of the feed drive shaft 203 is constant during feeding performed by the feed roller 201. Thus, stable feeding can be realized and the shaft that is bent less can be realized with a smaller amount of material.

Second Example

Figure 8:
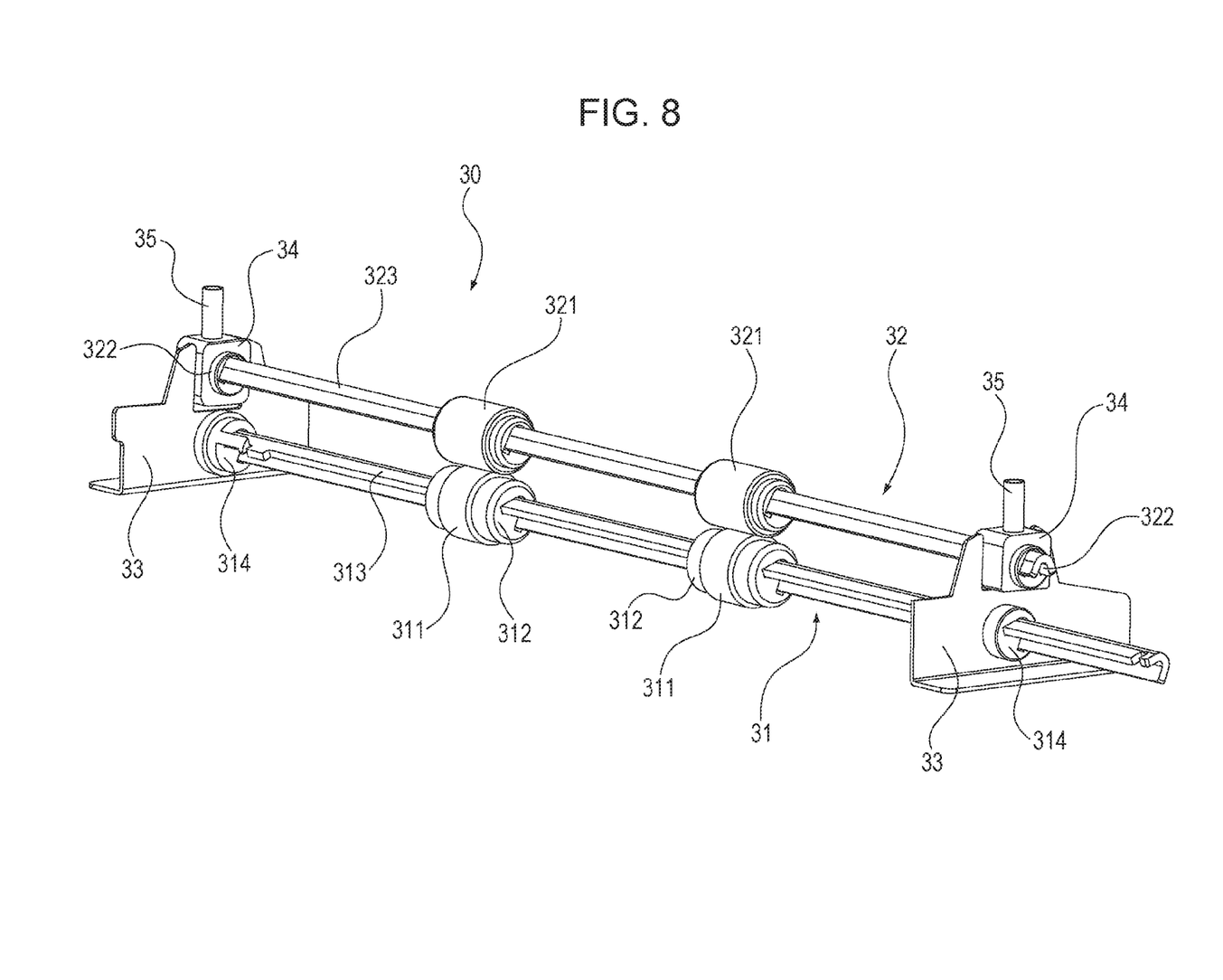
FIG. 8 is a perspective view of a conveyance roller pair using rotating shafts of a second example.

As illustrated in FIG. 8, the conveyance roller pair 30 after feeding includes a conveyance roller unit 31, a driven roller unit 32, conveyance roller side plates 33, driven roller bearings 34, pressure springs 35, and so forth. The conveyance roller unit 31 faces the driven roller unit 32 and is constantly rotated. The sheet that has been conveyed by rollers disposed on the upstream side and that enters a nip between the conveyance roller unit 31 and the driven roller unit 32 is conveyed by the conveyance roller pair 30.

The conveyance roller unit 31 includes conveyance rollers 311, conveyance roller cores 312, a conveyance roller shaft 313, and conveyance roller flanges 314. The conveyance rollers 311 each serve as the rotating member. The driven roller unit 32, which includes driven rollers 321, driven roller flanges 322, and a driven roller shaft 323, is rotated as a single component. The driven rollers 321 each serve as the rotating member. The conveyance roller shaft 313 and the driven roller shaft 323 are V-shaped rotating shafts formed by bending sheet metal. The inner angle θ of a bent portion of each of the conveyance roller shaft 313 and the driven roller shaft 323 is from 33 to 53°. Furthermore, the inner angle of the bent portion of the driven roller shaft 323 is set such that the moment of inertia of area increases in a pressure applying direction.

With the above-described structure, bending of the roller shafts 313 and 323 that are rotated is constant. Thus, stable feeding can be realized and the shafts that are bent less can be realized with a smaller amount of material. Furthermore, although torsion due to drive forces of the conveyance rollers 311 and forces from the facing driven rollers 321 are received, bending due to rotation can be maintained at a constant value and strength can be most efficiently improved with the same sheet metal material.

Third Example

Figure 9:
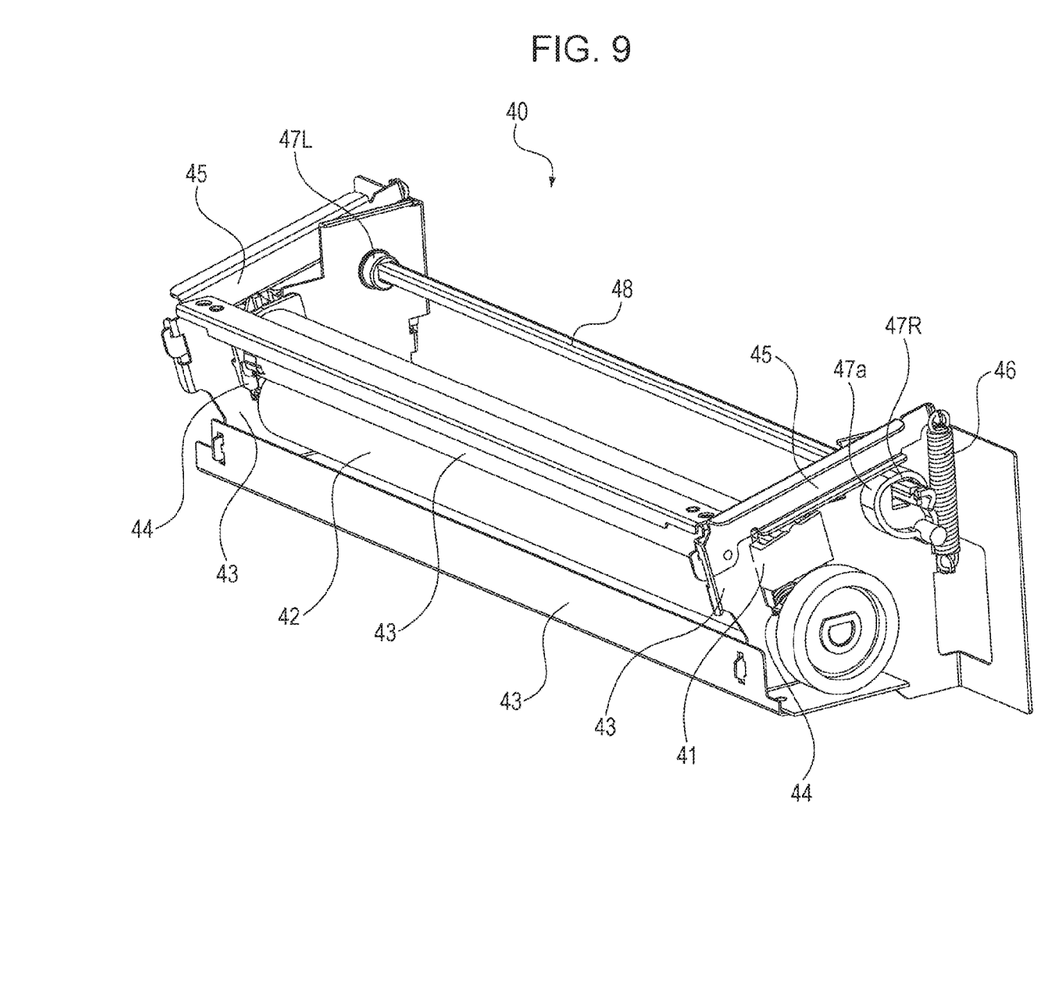
FIG. 9 is a perspective view of a fixing device of a third example.

As illustrated in FIG. 9, the fixing device 40 includes a heater 41, a pressure roller 42, fixing frames 43, pressure roller bearings 44, pressure members 45, pressure springs 46, and so forth. The pressure members 45 are urged downward by the pressure springs 46. The heater 41 is urged toward the pressure roller 42 through the pressure members 45. Furthermore, pressure release cams 47R and 47L are provided below the pressure members 45. The left and right pressure release cams 47R and 47L are connected to each other through a pressure release cam shaft 48. The pressure release cam shaft 48 is a V-shaped rotating shaft formed by bending sheet metal. The inner angle θ of a bent portion of the pressure release cam shaft 48 is from 33 to 53° and set such that the moment of inertia of area increases in a use range of the pressure release cams 47R and 47L.

Figure 10A:
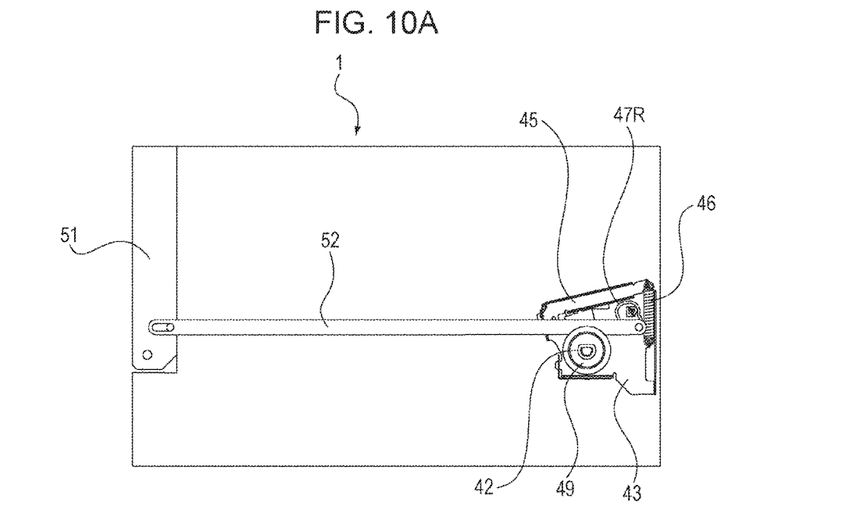
FIG. 10A is a schematic sectional view of a pressure release structure of the fixing device of the third example.
Figure 10B:
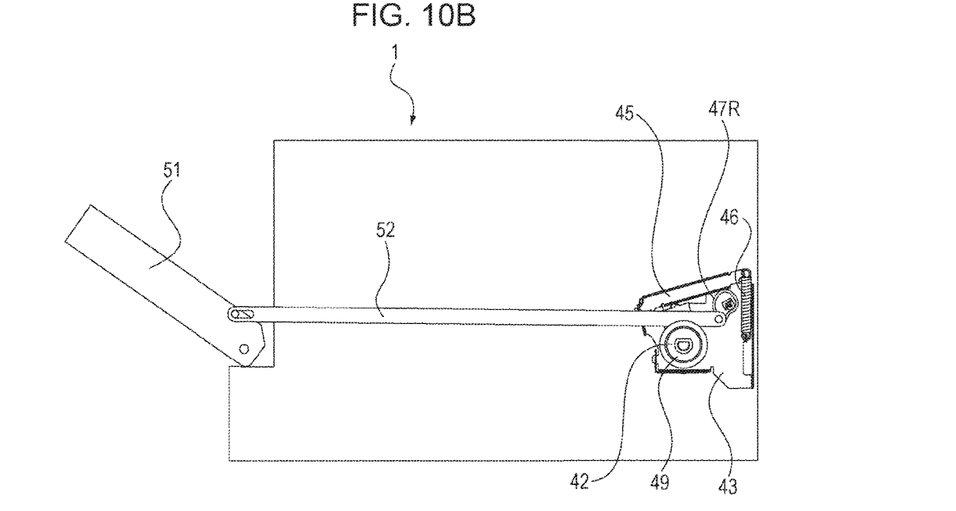
FIG. 10B is a schematic sectional view of the pressure release structure of the fixing device of the third example.

As illustrated in FIG. 10B, by opening a door 51 provided at the front, a pressure release link 52 that connects the front door 51 to the pressure release cam 47R is moved forward (leftward in FIG. 10B). This rotates the pressure release cam 47R clockwise at a specified angle (about 45° here). By rotating the pressure release cam 47R, the pressure release cam shaft 48 of FIG. 9 is rotated and the pressure release cam 47L is also rotated. This brings contact portions 47a of the pressure release cams 47R and 47L into contact with the pressure members 45, thereby moving the pressure members 45 upward. Thus, loads that have urged the heater 41 are released. In order to address paper jam from the front of the apparatus (left side in FIGS. 10A and 10B), it is required that the door 51 at the front be opened so as to allow access to a path of the sheet. At this time, since the door 51 at the front is opened as illustrated in FIG. 10B, the pressure of the fixing device 40 is also released as described above. Thus, removal of the jammed sheet is facilitated. Furthermore, by closing the door 51, the pressure release link 52 is moved rearward (rightward in FIGS. 10A and 10B). This rotates the pressure release cam 47R counterclockwise and returns to an initial position of FIG. 10A.

With the above-described structure, by setting the inner angle θ of the bent portion of the V-shaped rotating shaft to less than 90°, and more preferably, to an appropriate angle in a range from 33 to 53°, the shaft that is bent less can be realized with a smaller amount of material.

Other Examples

In the embodiment described above, the feed roller that feeds one sheet after another from the sheets, the conveyance rollers that convey the sheet, and the fixing roller that fixes the image while conveying the sheet have been described as the examples of the rotating member that includes the rotating shaft. However, the rotating member is not limited to this. The present invention is also effective for another rotating member that is rotated while being in contact with the sheet such as a roller that feeds the sheet onto which an image has been formed again to the image forming section or a roller that is used to fold or bend the sheet. The present invention is also effective for still another rotating member that is not limited to a rotating member rotated while being in contact with the sheet. That is, the present invention is effective for a rotating member such as, for example, a rotating member that supplies developer or a rotating member that transmits a drive force.

According to the embodiment described above, the printer is described as the example of the image forming apparatus. However, the present invention is not limited to this. For example, the image forming apparatus may be another image forming apparatus such as a scanner, a copier, or a facsimile machine, or may be still another image forming apparatus such as a multi-function machine having the functions of the scanner, the copier, the facsimile machine, and the like integrated into the multi-function machine. Similar effects can be obtained by applying the present invention to a rotating shaft that supports a rail rotating member used in these image forming apparatuses.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2014-260468, filed Dec. 24, 2014, which is hereby incorporated by reference herein in its entirety.

REFERENCE SIGNS LIST 10 rotating shaft
13, 16, 30 conveyance roller pair
20 feed roller unit
31 conveyance roller unit
32 driven roller unit
40 fixing device
41 heater
42 pressure roller
47R, 47L pressure release cam
48 pressure release cam shaft
201 feed roller
203 feed drive shaft
311 conveyance roller
313 conveyance roller shaft
321 driven roller
323 driven roller shaft

The invention claimed is:

1. A sheet conveyance device comprising:
a fixing roller that fixes an image on a sheet while conveying the sheet,
wherein the roller includes,
a rotating shaft formed by bending sheet metal,
wherein the rotating shaft includes a bent portion bent so that a section of the rotating shaft has a V shape, and an angle formed on an inner side of the bent portion is less than 90°.

2. The sheet conveyance device according to claim 1, wherein the angle formed on the inner side of the bent portion is from 33 to 53°.

3. The sheet conveyance device according to claim 2, wherein, when a sheet thickness of the rotating shaft is b, a length of a side of the V shape is h, and a radius of curvature on the inner side of the bent portion is R, h is 2b+R or more.

4. An image forming apparatus that forms an image on a sheet, the apparatus comprising:
a fixing roller that fixes an image on a sheet while conveying the sheet,
wherein the fixing roller, includes
a rotating shaft formed by bending sheet metal,
wherein the rotating shaft includes a bent portion bent so that a section of the rotating shaft has a V shape, and an angle formed on an inner side of the bent portion is less than 90°.

5. The image forming apparatus according to claim 4, wherein the angle formed on the inner side of the bent portion is from 33 to 53°.

6. The image forming apparatus according to claim 5, wherein, when a sheet thickness of the rotating shaft is b, length of a side of the V shape is h, and a radius of curvature on the inner side of the bent portion is R, h is 2b+R or more.

* * * * *